Aug. 8, 1967 B. ZAJIC ETAL 3,334,809

HIGH-SPEED OPERATED APPARATUS FOR PUNCHING RECORDING TAPE

Filed July 8, 1965 5 Sheets-Sheet 1

INVENTORS
Bohuslav Zajíc, Vladimír Panovský
BY
[signature] Agt

Aug. 8, 1967 B. ZAJIC ETAL 3,334,809

HIGH-SPEED OPERATED APPARATUS FOR PUNCHING RECORDING TAPE

Filed July 8, 1965 5 Sheets-Sheet 2

INVENTORS
Bohuslav Zajíc, Vladimír Panovský
BY

INVENTORS
Bohuslav Zajic, Vladimír Panovský
BY
Richard Low
Agt

INVENTORS
Bohuslav Zajic, Vladimír Panovský
BY
Richard Low
Agt

HIGH-SPEED OPERATED APPARATUS FOR PUNCHING RECORDING TAPE

Filed July 8, 1965 5 Sheets-Sheet 5

INVENTORS
Bohuslav Zajic, Vladimir Panovský
BY
Richard Lord Ag't

United States Patent Office 3,334,809
Patented Aug. 8, 1967

3,334,809

HIGH-SPEED OPERATED APPARATUS FOR PUNCHING RECORDING TAPE

Bohuslav Zajic and Vladimir Panovsky, both of Liberec, Czechoslovakia, assignors to Vyzkumny ustav matematickych stroju, Prague, Czechoslovakia Filed July 8, 1965, Ser. No. 470,424
Claims priority, application Czechoslovakia, July 13, 1964, 4,051/64, 4,052/64
8 Claims. (Cl. 234—106)

The present invention relates to apparatus having cooperating punches and dies, and more particularly to high-speed operated apparatus for punching holes in recording tape of the type used in conjunction with computing machines and the like.

Heretofore, dies and punches for the aforementioned purpose have been made from tool steels and sintered carbide, but such dies and punches were unable to satisfy the ever increasing demands of the cutting life and the quality of the punched holes, particularly at high-speed operation. In average use, dies and punches made of tool steel have a useful life of from one to three weeks. Dies and punches made of sintered carbides have a useful life of about four to six times greater, but even this is not satisfactory.

Accordingly, the primary object of the present invention is to provide dies and punches of the foregoing described type which have a prolonged useful cutting life.

Another object is to provide such dies and punches which can be readily installed in existing tape punching machines.

A further object is to accomplish the foregoing aims in a simple, practical and economical manner.

Still other objects will be apparent from the following description.

In accordance with the present invention, the foregoing object are generally accomplished by providing an improved punch and/or die construction wherein the cutting portion or edge is formed of a jewel material.

The term "jewel material" as used herein and in the appended claims includes natural or synthetic jewels and semi-jewels, for example, sapphire, corundum, topaz, chalcedony, jasper, agate, onyx, opal, and the like. All these materials have been found to be resistant to abrasive wear in punch and die arrangements; and all have a relatively high hardness, that is, No. 7 or higher in Mohs' scale of hardness. The preferred jewel material is artificially produced sapphire.

The specification is accomplished by drawings in which.

Figure 12:
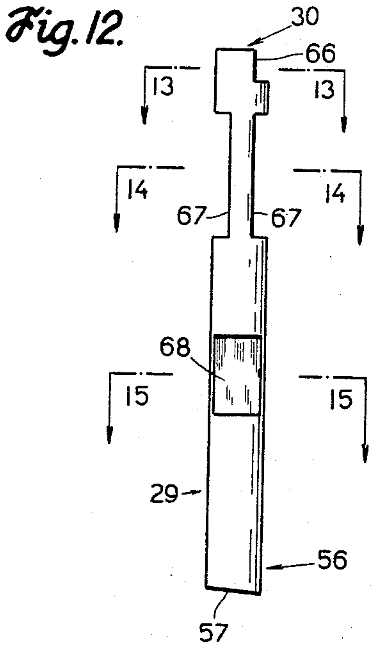
FIG. 12 is an enlarged elevational view of a punch illustrating yet another embodiment of the invention.
Figure 16:
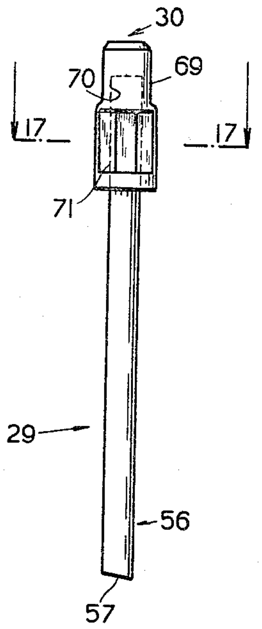
Figure 13:
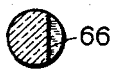
Figure 17:
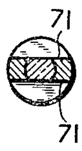
Figure 14:
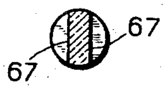
Figure 15:
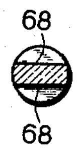

FIGS. 13, 14 and 15 are sectional views respectively taken along the lines 13—13, 14—14 and 15—15 in FIG. 12;

FIG. 16 is an enlarged elevational view of a punch illustrating still another embodiment of the invention: and FIG. 17 is a sectional view taken along the line 17—17 in FIG. 16.

Figure 1:
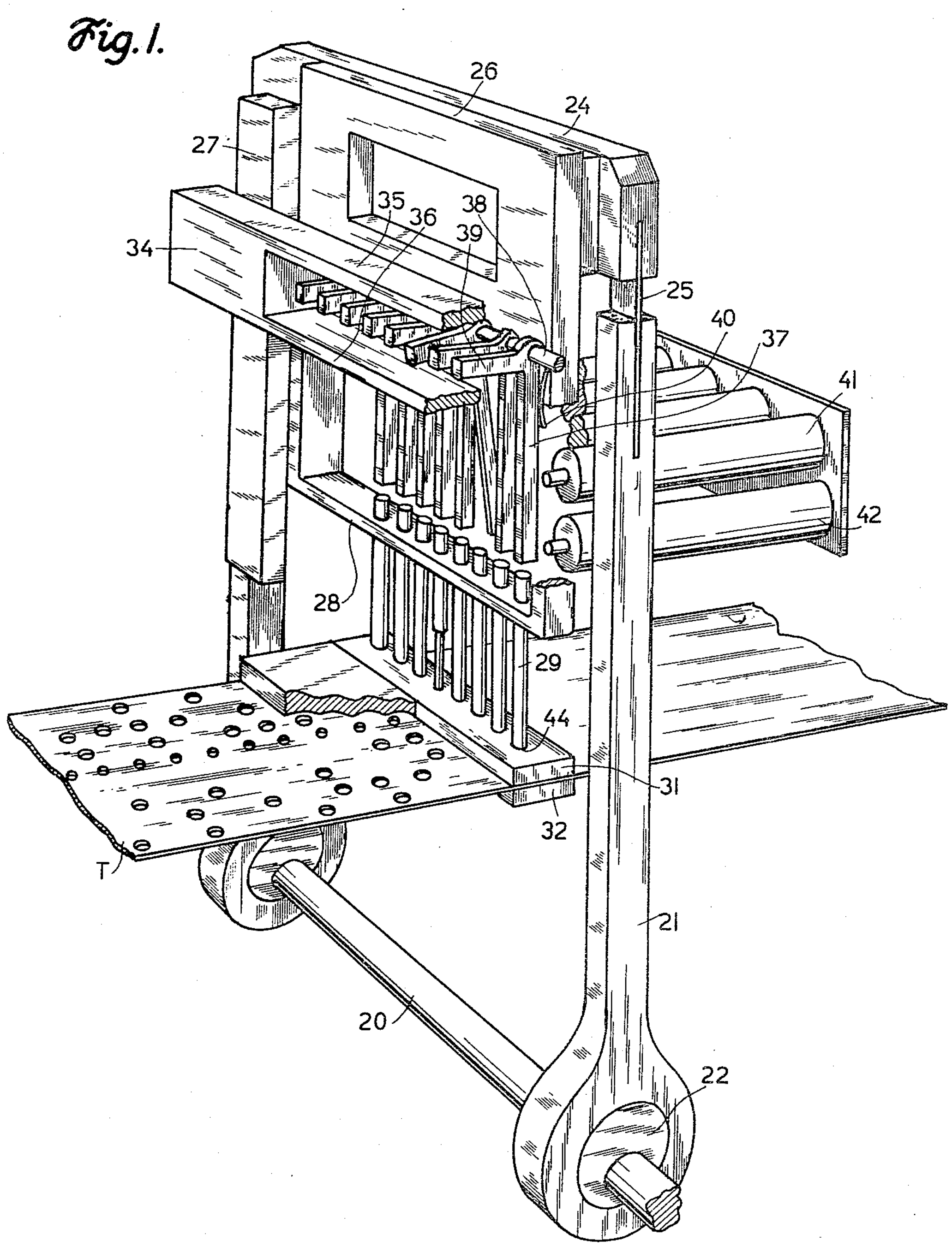
FIG. 1 is a perspective view of tape punching apparatus illustrating the arrangement and operation of dies and punches in accordance with the present invention.

Referring now to FIG. 1 of the drawings in detail, there is shown a portion of high-speed punching apparatus or mechanism of the type embodied in the Facit machine which is made in Sweden. The apparatus has a main shaft 20 on which two connecting rods 21 are mounted at opposite ends by means of eccentric bearings 22. The upper end of the rods 21 are each connected to a common crossarm 24 by a leaf spring 25. A guillotine 26 is mounted in the guideway of a vertical frame 27 and has its upper end secured to the crossarm 24 so that vertical motion of the guillotine is imparted thereto by the eccentric bearings 22. The lower end of the guillotine has a crossbar 28 formed with apertures in which punches 29 are slidably suspended. The upper ends of the punches are formed with a head 30, and the lower ends of the punches are slidably disposed in a guide plate 31 positioned above a die block 32 to enanble the tape T to be punched to pass between the guide plate and the die block.

A horizontal beam 34 is secured to the frame 27 and has an upper bar section 35 and a lower bar section 36. Hammers 37 formed of magnetic material, one for each punch 29, are pivotally mounted on a common shaft 38 carried by the guillotine 26, and are each provided with an offset shank 39 positioned between the upper and lower bar sections 35 and 36. Hammer springs 40, one for each hammer, are mounted on the guillotine, and each spring 40 bears against the rear side of one of the hammers. Upper and lower solenoids 41 and 42 face the rear of each hammer 37 to effect selective pivotal movement of the hammers for the purpose described hereinafter.

If required, a conventional fixed punch (not shown) for punching feed holes into the tape is secured to the crossbar 28. If a standard eight channel tape is to be punched, three punches 29 are located at one side of the feed hole punch and five at the other side.

When the guillotine 26 is in its upper or top position, the hammer shanks 39 contact the upper bar section 35 of the beam 34, thus turning the hammers 37 to position their lower ends above and in alignment with the punch heads 30. As the guillotine moves downwardly, the hammer shanks 39 no longer contact the bar section 35, and the hammer springs 40 tend to turn the hammers forwardly of the punch heads, so that they are ineffective to operate the punches. The hammers for the punches in channels where no holes are to be punched are allowed to move into and remain in such position. However, the hammers for the punches in channels where holes are to be punched are held aligned with their punch heads by energizing their solenoids 41 and 42 which overcome the force exerted by the hammer springs and attract the hammers.

As the guillotine 26 continues to move downwardly, the hammers 37 which are attracted by their solenoids 41 and 42 press punches 29 to move the same through the guide plate 31 and the tape T, which is stationary at this moment, and into the die block 32. Just before the guillotine reaches its lower or bottom position all the hammer shanks 39 contact the lower bar section 36 which overcomes the force of the solenoid and forces the solenoid-attracted hammers forwardly of their punches so that all of the hammers are held forwardly of their punches by the hammer springs 40. When the guillotine moves upwardly, its lower crossbar 28 engages the punch heads 30 and retracts the punches from the die block 32.

Figure 2:
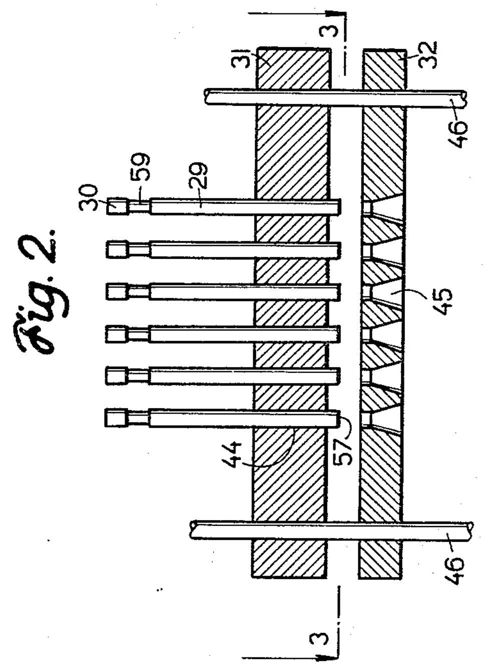
FIG. 2 is a sectional view in elevation of a die block and punches, illustrating one embodiment of the invention.
Figure 3:
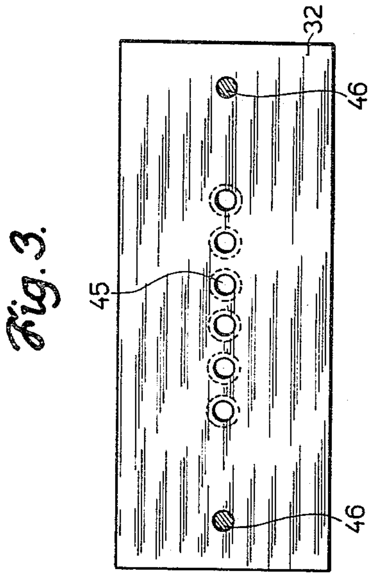
FIG. 3 is a plan view of the die block as seen when viewed along the line 3—3 of FIG. 2.

In FIGS. 2 and 3, the guide plate 31 and the die block 32 are shown in greater detail with lower ends of the punches 29 passing through holes 44 in the guide plate and die block being formed with cutting bores 45 for reception of the cutting end of the punches and cooperation therewith to punch holes into the tape. Centering pins 46 maintain the punches in alignment with the bores 45. In this embodiment of the invention, the die block is constructed entirely of metal and the cutting portion of the punches is formed of a jewel material in the manner described hereinafter. The cutting portion of the die block is provided by the upper edge of the bores 45.

Figure 4:
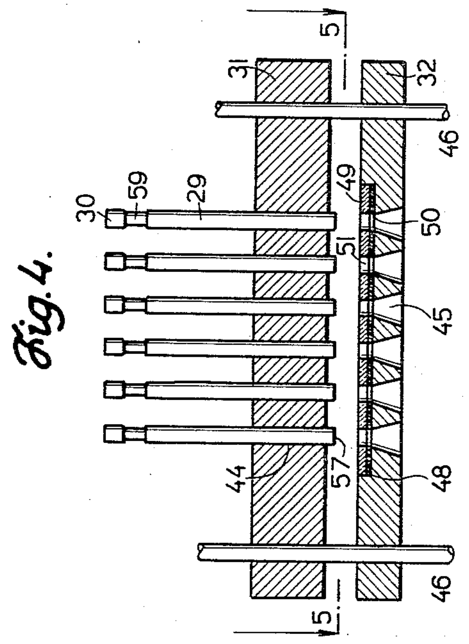
FIG. 4 is a sectional view in elevation of a die block and punches in accordance with another embodiment of the invention.
Figure 5:
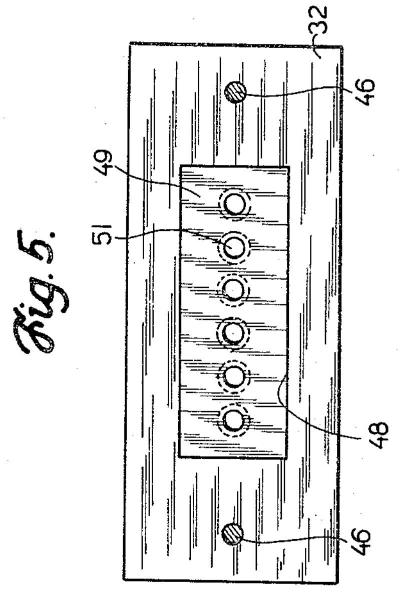
FIG. 5 is a plan view of the die block as seen when viewed along the line 5—5 of FIG. 4.

In FIGS. 4 and 5, a similar guide plate and die block arrangement is shown wherein the die block comprises a metallic block section 47 formed with the lower portion of the bores 45 and has a recess 48 on its upper surface; and a plate or unit 49 formed of jewel material is inserted and adhesively secured by epoxy resin 50 in the recess 48, which plate has bore portions or openings 51 matching the bores 45 and constituting cutting members for cooperation with the punches. In this embodiment of the invention, the cutting portion of the punches may be formed of conventional materials or of jewel materials.

Figure 6:
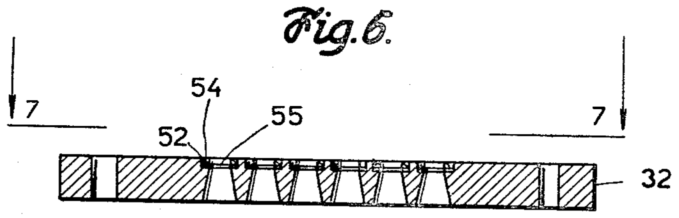
FIG. 6 is a sectional view in elevation of a die block, illustrating yet another embodiment of the invention.
Figure 7:
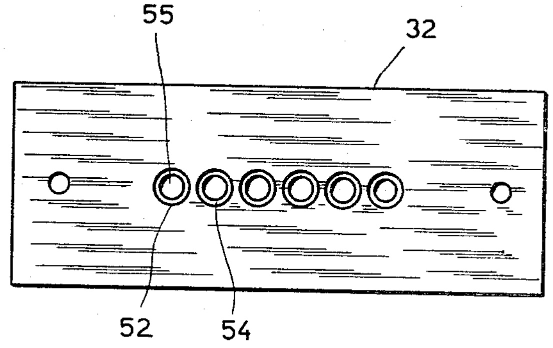
FIG. 7 is a plan view of the die block as seen when viewed along the line 7—7 in FIG. 6.

In FIGS. 6 and 7, a die block 32 is shown which comprises a metallic block section 47 formed with the lower portions of the bores 45 and having an annular recess 52 at the upper end of each of the bore portions; and an annular member 54 formed of jewel material is inserted and secured in each of the recesses 52 and has a bore portion or opening 55 matching a bore 45 and constituting the cutting member for cooperation with a punch.

In FIGS. 8 to 17, punches are shown which can be used in conjunction with the die block 32 shown in FIGS. 2 to 7. These punches have a cutting portion 56 at their lower end formed of jewel material. In order to obtain uniform distribution of the cutting force during the punching stroke, the cutting portion of the punch is provided with a bevel or rake 57.

Figure 8:
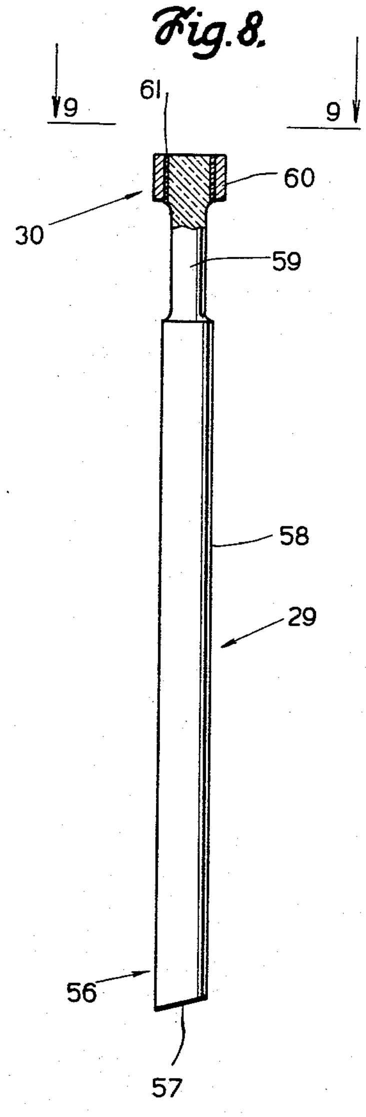
FIG. 8 is an enlarged elevational view, partly in section, of a punch in accordance with one embodiment of the invention.
Figure 9:
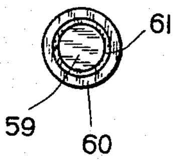
FIG. 9 is a plan view of the head of the punch as seen when viewed along the line 9—9 in FIG. 8.

The punch shown in FIGS. 8 and 9 comprises a body 58 formed of jewel material and provided with the cutting portion 56 and a neck 59 which is slidably mounted in the apertures of the cross bar 28; and a punch head 30 is provided by a metallic collar 60 secured to the neck 59 by an adhesive such as epoxy resin 61 or by being press fitted thereon.

Figure 10:
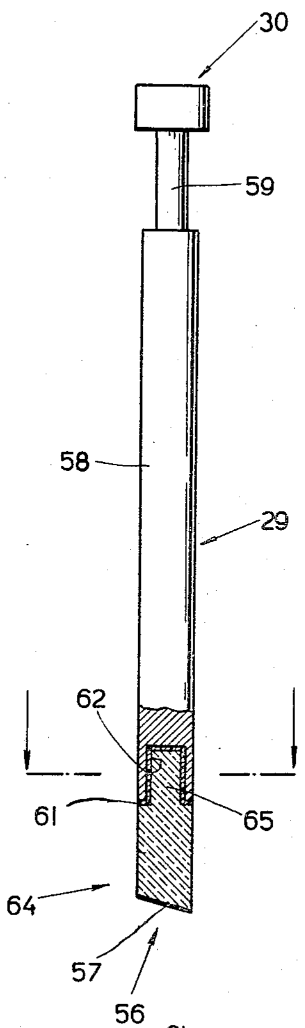
FIG. 10 is an enlarged elevational view, partly in section of a punch in accordance with another embodiment of the invention.
Figure 11:
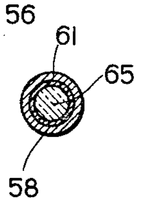
FIG. 11 is a sectional view taken along the line 11 in FIG. 10.

The punch shown in FIGS. 10 and 11 comprises a metallic (steel) body 58 formed with a head 30 and a neck 59 at its upper end and with a bore 62 at its lower end; and a cutting element 64 formed of jewel material and being provided with the rake or bevel 57 at its lower end and having a reduced section or plug portion 65 lifted into and secured in the bore 62 by epoxy resin 61.

The punch shown in FIGS. 12 to 15 is of the type preferably used with high speed Teletype tape punching apparatus. In this embodiment of the invention, the punch is entirely of jewel material and is generally cylindrical in shape but is recessed at 66, 67, and 68. The recess 66 at the top is for the hammer in case the punch is idle. If the punch is to be operated, the hammer in this apparatus is moved into alignment with the central axis of the punch. Recesses 67 at opposite sides of the punch provide a neck adapted for attachment of the punch on the crossbar 28 and fixing its position. Recesses 68 at opposite sides of the punch provide shoulders for the reception of a spring (not shown) which retains the punch in its idle position when it is not required to punch the tape.

The punch shown in FIGS. 16 and 17 comprises a cylindrical body 58 formed of jewel material, and a metallic cap 69 formed with a bore 70 for reception and securement of the upper end of the body. The cap 69 provides the punch head and has recesses 71 at opposite sides forming a neck for fixing the punch in proper position on the crossbar 28.

The punch and die arrangement in accordance with the invention can be applied to all types of known tape punching apparatus, such as Facit, Teletype, Creed machines and the like.

From the foregoing description, it will be seen that the main advantage of the invention resides in the fact that the punch and die arrangements, particularly when used in high-speed tape punching apparatus of the type indicated herein, have an increased cutting life which satisfies modern requirements and extends the life of the highly stressed parts of high-speed punching apparatus. This increases the capacity of automatic computers and the like because time losses due to frequent replacement and maintenance of the cutting elements of the punch are greatly minimized.

It will be apparent that while we have shown and described our invention in a number of forms only, many changes and modifications may be made without departing from the spirit of the invention defined in the following claims.

We claim:

1. In high-speed operated apparatus for holes in recording tape of the type used in conjunction with computing machines, the combination of a die having a cutting member, a punch having a cutting member for cooperation with said other members to punch holes in the tape, and means for driving said punch into said die member, at least one of said members being formed of a jewel material.

2. In apparatus according to claim 1, wherein said punch has a body formed of jewel material which constitutes the cutting member and is provided with a cutting portion at one end and has a neck at the other end, and a metallic collar is secured to said neck to provide a head for engagement by said punch driving means.

3. In apparatus according to claim 1, wherein said punch has a body formed of jewel material which constitutes the cutting member and is with a cutting portion at one end; and a metallic cap secured to the other end of said punch to provide a head and being recessed at opposite sides to provide a neck.

4. In apparatus according to claim 1, wherein said punch is formed entirely of jewel material and has a head and a neck at its upper end and has a cutting portion at its lower end.

5. In apparatus according to claim 1, wherein said punch has a body formed of metal which has a head at one end for engagement by said punch driving means, and said cutting member is secured to the other end of said punch body and has a cutting edge.

6. In apparatus according to claim 5, wherein said punch body has a bore at the end opposite said head, and said cutting member has a plug portion inserted into said bore and has a shoulder engaging the end of said punch body formed with said bore.

7. In apparatus according to claim 1, wherein said die has a plurality of openings therein; and individual cutting members formed of jewel material are inserted and secured in said openings.

8. In apparatus according to claim 1, wherein a unit formed of jewel material overlies openings in the die, and said unit has openings in registry with the die openings the edges of which constitute cutting members for the die.

References Cited

UNITED STATES PATENTS

| | | | |
|---|---|---|---|
| 2,801,696 | 8/1957 | Banko | 83—690 |
| 2,808,108 | 10/1957 | Pellegrino | 83—686 |
| 3,183,757 | 5/1965 | Sorensen | 234—131 |
| 3,232,527 | 2/1966 | Hiser | 234—131 |

WILLIAM W. DYER, Jr., *Primary Examiner.*

GERALD A. DOST, *Examiner.*